United States Patent
Scharfenberg

(10) Patent No.: US 12,214,403 B2
(45) Date of Patent: Feb. 4, 2025

(54) METHOD AND DEVICE FOR DETERMINING A BENDING ANGLE ON A BENDING MACHINE

(71) Applicant: Bystronic Laser AG, Niederönz (CH)

(72) Inventor: Kevin Scharfenberg, Großrettbach (DE)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/282,516

(22) PCT Filed: Mar. 24, 2022

(86) PCT No.: PCT/EP2022/057742
§ 371 (c)(1),
(2) Date: Sep. 16, 2023

(87) PCT Pub. No.: WO2022/200488
PCT Pub. Date: Sep. 29, 2022

(65) Prior Publication Data
US 2024/0157425 A1 May 16, 2024

(30) Foreign Application Priority Data
Mar. 25, 2021 (EP) .................................... 21164938

(51) Int. Cl.
*B21D 5/00* (2006.01)
*B23Q 15/12* (2006.01)
(Continued)

(52) U.S. Cl.
CPC ............. *B21D 5/006* (2013.01); *B21D 5/004* (2013.01); *B23Q 15/12* (2013.01); *B23Q 15/26* (2013.01);
(Continued)

(58) Field of Classification Search
CPC ........ B21D 5/002; B21D 5/004; B21D 5/006; G01B 11/167; G01B 11/2513;
(Continued)

(56) References Cited

FOREIGN PATENT DOCUMENTS

| CN | 103575238 A | * | 2/2014 | ............. B21D 5/006 |
| CN | 103576238 A | | 2/2014 | |

(Continued)

OTHER PUBLICATIONS

DE 19939837 (A1) English Language Translation.
(Continued)

*Primary Examiner* — Jared O Brown
(74) *Attorney, Agent, or Firm* — Belay IP

(57) ABSTRACT

The present disclosure is directed to a method for determining the bending angle on a bending machine, wherein the bending machine includes an upper tool and a lower tool for reshaping a workpiece by bending along a bending line. One or more measuring arrangements are positioned on the bending machine, which together include at least one illumination device and in each case at least one image acquisition device. Each measuring arrangement is assigned a different surface portion of the workpiece which lies laterally adjacent to the bending line and extends along the bending line. A light pattern is imaged on the workpiece by means of the at least one illumination device of a respective measuring arrangement onto the assigned surface portion. The light pattern contains a plurality of zones which are arranged side by side along the bending line.

15 Claims, 5 Drawing Sheets

(51) Int. Cl.
  *B23Q 15/26* (2006.01)
  *B23Q 17/24* (2006.01)
  *G01B 11/16* (2006.01)
  *G01B 11/25* (2006.01)
  *G01B 11/26* (2006.01)

(52) U.S. Cl.
  CPC ............ *B23Q 17/249* (2013.01); *B21D 5/002* (2013.01); *G01B 11/167* (2013.01); *G01B 11/2513* (2013.01); *G01B 11/2545* (2013.01); *G01B 11/26* (2013.01); *G05B 2219/37403* (2013.01); *G05B 2219/37571* (2013.01); *G05B 2219/39045* (2013.01); *G05B 2219/45143* (2013.01)

(58) Field of Classification Search
  CPC ................ G01B 11/2545; G01B 11/26; G05B 2219/37403; G05B 2219/37571; G05B 2219/39045; G05B 2219/45143; B23Q 15/12; B23Q 15/26; B23Q 17/249
  See application file for complete search history.

(56) References Cited

FOREIGN PATENT DOCUMENTS

| | | | | |
|---|---|---|---|---|
| DE | 19939837 A1 | * | 3/2001 | ............... B21D 5/02 |
| EP | 2995391 A2 | * | 3/2016 | ............. B21D 5/006 |
| EP | 2996391 A2 | | 3/2016 | |
| KR | 101916753 B1 | * | 11/2018 | |
| WO | WO-2010053428 A1 | * | 5/2010 | ............. B21D 5/006 |
| WO | WO2010053428 (A1) | | 5/2010 | |
| WO | WO2016058020 A1 | | 4/2016 | |
| WO | WO-2016070212 A1 | * | 5/2016 | ............. B21D 5/006 |

OTHER PUBLICATIONS

CN 103575238 (A) English Language Translation.
EP2995391 (A2) English Language Translation.
KR 101916753 (B1) English Language Translation).
WO2016058020 (A1) English Language Translation.
OEE Workproduct—International Preliminary Report on Patentability, for PCT/EP2022/057742, dated Oct. 19, 2022.

* cited by examiner

METHOD AND DEVICE FOR DETERMINING A BENDING ANGLE ON A BENDING MACHINE

CROSS REFERENCE TO RELATED APPLICATION

This application is a national stage of international application PCT/EP2022/057742, filed Mar. 24, 2022, which claims priority to Swiss patent application 21164938.9, filed Mar. 25, 2021, the content of the both of which s herein incorporated by reference.

BACKGROUND OF THE INVENTION

Field of the Invention

The invention relates to a method and a device for determining a bending angle on a bending machine and to a corresponding bending machine.

Measuring arrangements according to the background of the art are known for contactless determination of the bending angle of the workpiece on a bending machine during bending of a workpiece or metal sheet. In particular, optical methods are used for this purpose, in which a light pattern is directed onto a section of the formed workpiece and recorded by a camera. The bending angle can then be calculated using known methods of trigonometry based on the deformation of this light pattern during bending.

Description of Related Art

The publication WO 2016/058020 A1 describes a method for measuring a bending angle in which a light pattern is imaged onto the bottom side of the workpiece and a section of the lower tool with an illumination device during the bending of a workpiece and is acquired by an image acquisition device. The bending angle can then be determined from the acquired image information. Optionally, the bending angle measuring device can be moved along the bending line of the workpiece to determine the bending angle in different regions of the workpiece.

The publication WO 2010/053428 A1 similarly discloses a bending angle measuring device in which a light pattern directed at a workpiece during bending is acquired to derive the bending angle of the workpiece therefrom. The measuring device shown there can also be moved along the bending line. Furthermore, the acquired bending angles can be used to adjust the crowning or curvature of the lower tool.

Document CN 103 575 238 A discloses a bending machine for bending a workpiece where the bending angle of the workpiece is determined in a contactless manner. To do so, several stripes are projected onto the workpiece and a lower tool of the bending machine. Images of those stripes are acquired by two cameras and the bending angle at the stripes is determined from those acquired images.

In the bending angle measuring devices described in the above-mentioned documents, the bending angle can only ever be determined for a specific point on the workpiece at a corresponding measuring time. Although the position where the bending angle can be changed, the measuring device must be moved mechanically for this purpose. This leads to inaccuracies in determining the bending angle.

BRIEF SUMMARY OF THE INVENTION

An object of the presently disclosed invention is to provide a method and a device for determining a bending angle on a bending machine, with which bending angles can be determined with high accuracy for a large number of positions along the bending line.

This object is achieved by the method and the device according to the claims

The method according to the invention is used for determining a bending angle on a bending machine, wherein the bending machine comprises, in a manner known per se, an upper tool and a lower tool for reshaping a workpiece and preferably a metal sheet arranged between the upper tool and the lower tool by bending along a bending line. Positioned on the bending machine are one or more measuring arrangements that together include at least one illumination device (i.e., a single or multiple illumination devices) and at least one image acquisition device (i.e., a single or multiple image acquisition devices), respectively. In other words, at least one illumination device belongs to each measuring arrangement, wherein the same illumination device may optionally belong to several measuring arrangements. Preferably, at least one (other) illumination device is provided separately for each measuring arrangement. Each measuring arrangement is assigned a different surface portion of the workpiece, which is located laterally adjacent to the bending line and extends along the bending line. In case of multiple measuring arrangements, the regions of the individual surface portions are preferably disjoint, but they may optionally overlap.

With the method according to the invention, a light pattern is imaged onto the workpiece by means of the at least one illumination device of a respective measuring arrangement (i.e., each measuring arrangement) on the assigned surface portion. The light pattern thus represents a light distribution that is imaged onto the workpiece all at once and is not generated successively at different times. In this context, a light pattern means a pattern of electromagnetic radiation in the wavelength range between ultraviolet and infrared, i.e., the light pattern can include visible light and, optionally, also non-visible light in the ultraviolet or infrared range. The correspondingly imaged light pattern comprises a plurality of zones arranged side by side along the bending line, the plurality of zones being arranged immediately adjacent side by side, whereby the light pattern essentially covers the entire surface of the assigned surface portion. Preferably, the zones represent disjoint, non-overlapping regions, which further are (directly) adjacent to one another.

By means of the at least one image acquisition device of the respective measuring arrangement, the imaged light pattern is acquired, whereby image information of the light pattern is obtained. This image information is further processed by means of an evaluation device, which identifies the zones contained in the light pattern of the respective measuring arrangement from the image information and determines for each zone a bending angle of the assigned surface portion of the workpiece caused by bending.

The method according to the invention has the advantage that several bending angles can be determined simultaneously without contact and without mechanical movement of measuring arrangements for a large number of different regions along the bending line. For this purpose, the light pattern is divided into different zones, which are identified in the image information of the correspondingly acquired light pattern. For this identification, methods of image analysis known per se can be utilised. Likewise, image processing methods known per se can be utilised to determine the bending angle in the respective zones. For example, respective point clouds representing three-dimensional positions of the light pattern on the workpiece can be determined in the individual zones. From these point clouds, a slope and from this the bending angle can be derived by means of linear regression. Likewise, the bending angle can be derived from the deformation of the light pattern in the corresponding zone, for example from the deformation of a line in the light pattern. According to the invention, it is no longer necessary to determine bending angles from region to region in a time-consuming and thus error-prone manner.

In one variant of the method according to the invention, the at least one image acquisition device of at least one measuring arrangement, and optionally of each measuring arrangement, is a 3D image acquisition device (e.g., a 3D camera) with which three-dimensional image information is acquired. Alternatively or additionally, it is also possible that the at least one image acquisition device of at least one measuring arrangement and, if applicable, of each measuring arrangement is a 2D image acquisition device (e.g., a monocular camera) with which two-dimensional image information is acquired.

In a further preferred embodiment of the method according to the invention, the zones in the light pattern are defined for at least one measuring arrangement and optionally for each measuring arrangement by means of respective spatial extents along the bending line, which are stored in the evaluation device (as digital data). In this case, the at least one image acquisition device is a 3D image acquisition device which determines the spatial extents of the zones from the acquired three-dimensional image information of the light pattern by comparison with the spatial extents stored in the evaluation device and thereby identifies the zones. This variant provides the advantage that information on the zones can be stored purely on the basis of digital data and does not have to result directly from the light pattern itself.

In a further embodiment of the method according to the invention, the zones in the light pattern are coded for at least one measuring arrangement and optionally for each measuring arrangement, wherein the evaluation device decodes this coding from the acquired image information of the light pattern and thereby identifies the zones. While this variant requires specific light patterns from which the zones can be derived, it is possible that a 2D image acquisition device could optionally be used to acquire the light pattern.

In a preferred variant of the embodiment described above, one or more zones and in particular all zones of the plurality of zones are coded via light frequencies and/or via brightnesses in the light pattern. In other words, the zones can be identified by special colours or colour mixtures, or by shades of grey.

In a preferred embodiment of the embodiment described above, one or more zones, and in particular all zones of the plurality of zones, include stripes with different brightnesses and/or frequency spectra, wherein a frequency spectrum can comprise a single frequency or a range of frequencies. The stripes preferably extend perpendicular to the bending line on the workpiece, which simplifies the determination of the bending angle. Preferably, the stripes are (directly) adjacent to one another and represent at their adjacent edges unique light frequency and/or brightness transitions, each of which occurs only once in the light pattern. By identifying these edges, their deformation can be determined and the bending angle be calculated on the basis of the light section method known per se.

In another preferred embodiment, one or more zones, and in particular all zones of the plurality of zones, are coded via differently patterned regions. For example, a respective patterned region can include the same types of graphical elements for patterning in the respective patterned region, wherein the types of graphical elements differ between the patterned regions.

In a further preferred embodiment, for at least one measuring arrangement and optionally for each measuring arrangement, the light pattern is also imaged onto a region of the lower tool or upper tool, wherein the bending angles for the zones with respect to this region are determined by means of the evaluation device by evaluating the image information of this region acquired with the at least one image acquisition device. This also allows the bending angle to be calculated in relation to the orientation of the corresponding bending tool.

In a further preferred variant of the method according to the invention, a plurality of measuring arrangements are positioned on the bending machine, the at least one illumination device of which images light patterns with the same or overlapping extensions along the bending line onto different and preferably disjoint surface portions, whereby by means of the evaluation device for a plurality of positions or portions along the bending line in each case a plurality of bending angles are determined which are based on light patterns from different measuring arrangements. The evaluation device calculates an averaged bending angle or a bending angle between two bending areas of the workpiece bent about the bending line for each position or section from the multiple bending angles. This can improve the accuracy of determining the bending angle.

In a preferred variant of the embodiment described above, all light patterns of the multiple measuring arrangements contain identical divisions into zones along the bending line, so that the positions or portions along the bending line defined above correlate with corresponding zones, thereby simplifying the determination of the averaged bending angles or the bending angles between two bending regions of the workpiece bent about the bending line.

In a further preferred variant of the method according to the invention, one or more parameters of the bending machine are triggered by the evaluation device and changed during bending as a function of the determined bending angles. In other words, depending on the bending angles, a corresponding control of the bending machine is effected to adjust its bending process.

In another preferred embodiment, the bending machine has an automatically operable crowning device for generating a curvature of the lower tool during bending, wherein this curvature is adjusted as a function of the determined bending angles. Automatically operable crowning devices are known per se and serve to compensate for an upward curvature of the upper tool caused during the bending process by a corresponding curvature of the lower tool. By determining the bending angles for different zones, the curvature of the lower tool can be suitably tracked, improving the quality of the bending.

In a preferred embodiment, the automatically operable crowning device comprises a plurality of crowning cylinders arranged side by side along the bending line. Each zone can be assigned to exactly one crowning cylinder, allowing the crowning to be adapted to the bending angle measured in the zone. Alternatively, two or more zones can be assigned to one crowning cylinder.

In addition to the method described above, the invention relates to a device for determining a bending angle on a bending machine, wherein the bending machine comprises an upper tool and a lower tool for reshaping a workpiece and, in particular, a metal sheet arranged between the upper tool and the lower tool by bending along a bending line. The device has an evaluation device and one or more measuring arrangements. The measuring arrangement or measuring arrangements are configured to be positioned in an operating position of the device on the bending machine. The measuring arrangement or measuring arrangements together include at least one illumination device. Further, they each include at least one image acquisition device. In the operating position of the device, each measuring arrangement is assigned a different surface portion of the workpiece, which is located laterally adjacent to the bending line and extends along the bending line.

The device according to the invention is designed in such a way that the steps explained below are carried out in the operating position. A light pattern is imaged onto the workpiece by means of the at least one illumination device of a respective measuring arrangement (i.e., each measuring arrangement) onto the assigned surface portion, wherein the light pattern contains a plurality of zones which are arranged side by side along the bending line, the plurality of zones being arranged immediately adjacent side by side, whereby the light pattern essentially covers the entire surface of the assigned surface portion. By means of the at least one image acquisition device of the respective measuring arrangement, the light pattern is acquired, whereby image information of the light pattern is obtained. By means of the evaluation device, the zones contained therein are identified from the image information of the light pattern of the respective measuring arrangement, and a bending angle of the assigned surface portion of the workpiece caused by bending is determined for each zone.

In other words, the device described above is configured to carry out the process according to the invention. Preferably, the device can also be configured to perform one or more preferred variants of the method according to the invention.

In a preferred embodiment, the bending machine has an automatically operable crowning device for generating a curvature of the lower tool during bending, wherein the crowning device is configured to adjust this crowning as a function of a determined bending angle.

In addition to the device described above, the invention comprises a bending machine containing such a device.

BRIEF DESCRIPTION OF THE SEVERAL VIEWS OF THE DRAWINGS

Exemplary embodiments of the invention are described in detail below with reference to the accompanying figures.

In the figures.

DETAILED DESCRIPTION OF THE INVENTION

Figure 1:
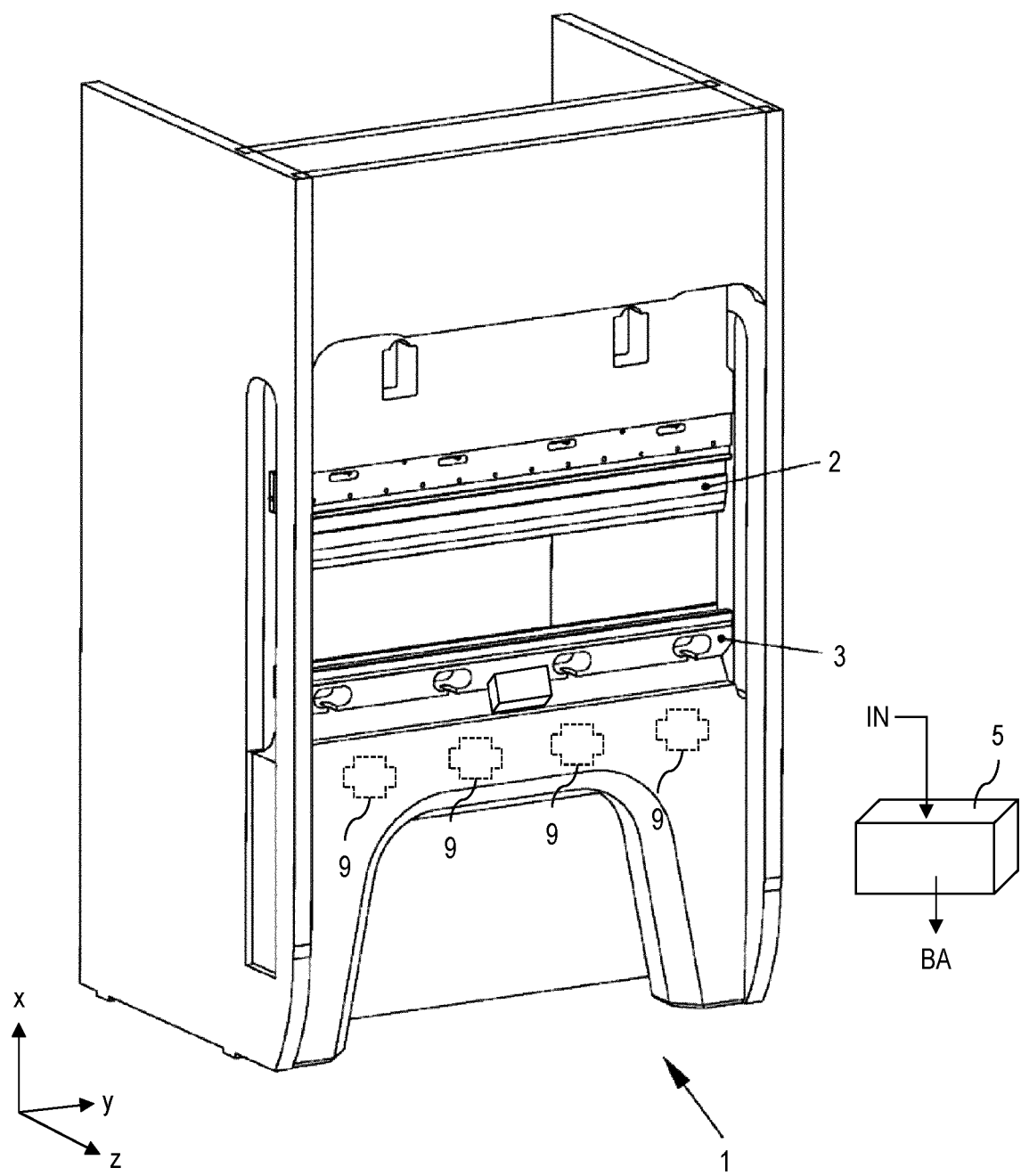
FIG. 1 shows a perspective view of an embodiment of a bending machine to which a variant of a device for determining a bending angle according to the invention is attached.

In the following, embodiments of the invention are described with reference to a bending machine 1 in the form of a press brake. Such a bending machine is shown in a perspective view in FIG. 1. In a manner known per se, the bending machine comprises an upper tool 2 and a lower tool 3, between which a workpiece 6 to be bent in the form of a metal sheet (see FIG. 2) is inserted. By means of an actuator, bending of the workpiece is effected by moving the upper tool 2 downward into the lower tool 3, as will be explained in more detail with reference to FIG. 2. The bending effected in this way occurs along a bending line BL extending in the longitudinal direction of the upper tool and lower tool (see FIG. 2), which corresponds to the direction y of the coordinate system shown in FIGS. 1 to 5. The x-direction of this coordinate system corresponds to the vertical height direction and the z-direction corresponds to a horizontal direction which extends opposite to the direction in which a workpiece to be reshaped is inserted into the bending machine 1 from the front.

To monitor the bending process in the bending machine 1, a device is used which comprises a measuring arrangement 4 and an evaluation device 5. The measuring arrangement 4 is positioned on the front of the bending machine 1 adjacent to the lower tool 3 and, in operation, images a light pattern onto the bottom side of the workpiece that has just been formed and also, in part, onto a region of the lower tool 3. The light pattern is then acquired as a digital image by means of the measuring arrangement, and the image information IN obtained in this way is supplied to the evaluation device 5, which is connected to the measuring arrangement 4 in a communicating manner. By means of the evaluation device 5, a plurality of bending angles BA for several different zones along the bending line or y-axis are determined from the light pattern, as will be explained in more detail below.

The evaluation device 5 is connected to a corresponding user interface on the bending machine or a user interface located remotely therefrom in a communicating manner, so that corresponding information on the bending angles can be displayed to a user. Optionally, the evaluation device can also automatically act on a control system (not shown) of the bending machine in order to compensate for irregularities during the bending process, e.g., by adjusting an automatically operable crowning device, as will be described in more detail below.

The main difference between the method for determining a bending angle described here and conventional methods is that several zones along the bending line are identified in a single light pattern that is imaged onto the workpiece, for which bending angles are determined separately. It is therefore no longer necessary to mechanically move the corresponding arrangement to different positions along the bending line in order to measure bending angles, as is the case with the background of the art.

The information about the bending angles for different sections or zones of the workpiece along the bending line is an important parameter for detecting malfunctions during bending as part of quality assurance measures or for optimising parameters of the bending machine. Often a bending machine contains an automatically operable crowning device, which effects a curvature of the lower tool, e.g., using hydraulic cylinders. This curvature of the lower tool can be adjusted, taking into account the bending angles in the various zones, to specifically counteract any curvature of the upper tool that occurs during the bending process. This ensures uniform bending of the workpiece along the bending line.

The bending machine according to FIG. 1 also includes a corresponding crowning device, which comprises four crowning cylinders 9 arranged side by side in the y-direction and shown in dashed lines, which are arranged in the lower beam below the lower tool 3. Each zone of the light pattern directed at the lower tool can be assigned to exactly one crowning cylinder. This allows the crowning to be adjusted to the angular deviation measured in the zone. Alternatively, two or more zones can be assigned to one crowning cylinder.

Even in the case that the crowning in the bending machine is adjusted mechanically in advance using suitable wedges, the crowning can be checked via the determined bending angles along the bending line during maintenance of the machine and, optionally, be suitably adjusted. In addition, by determining the bending angles in the various zones, irregularities in the rebound of the bent workpiece that occurs when the bending process is interrupted or terminated can also be easily detected.

In the embodiment of FIG. 1, only a single measuring arrangement 4 is provided on the front of the bending machine 1. Alternatively or additionally, a corresponding measuring arrangement can also be positioned on the opposite side of the lower tool 3. Preferably, the data of both measuring devices are offset with one another in the evaluation device 5 in order to determine the respective bending angles of the two bent sections of the deformed workpiece.

Figure 2:
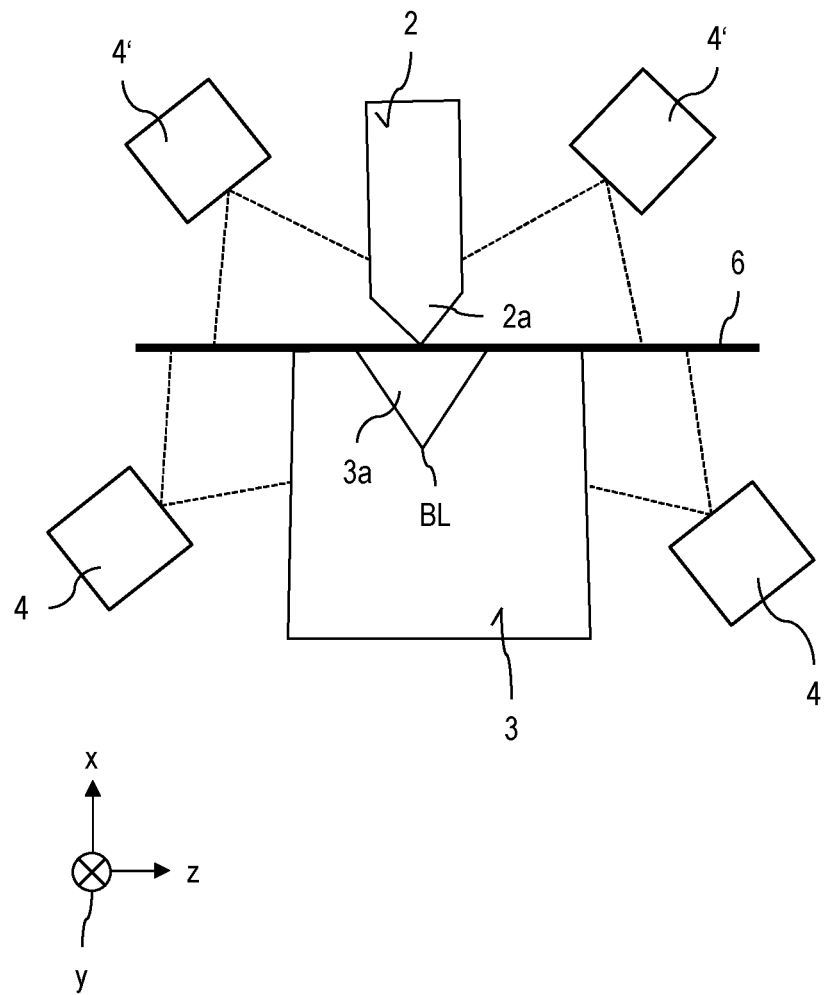
FIG. 2 shows a sectional view perpendicular to the bending line of the bending machine from FIG. 1, in which various options for the arrangement of corresponding measuring devices are illustrated.

FIG. 2 shows a sectional view along the x-z plane of the coordinate system of FIG. 1. The cutting plane extends perpendicular to the bending line BL through a region of the upper tool 2 and the lower tool 3. The time at which a force is applied to the workpiece or metal sheet 6 is shown. FIG. 2 shows the shape of the upper tool 2 and the lower tool 3 in detail. The upper tool 2 forms a punch with a lower wedge 2a, which has a triangular cross-section. This wedge 2a is moved into a corresponding groove 3a in the lower tool 3. The lower tool is often also referred to as the die. The bending line BL corresponds to the tip of the groove 3a extending along the y-direction.

During the bending process, the workpiece 6 to be reshaped is positioned between the upper tool 2 and the lower tool 3, so that moving the upper tool 2 into the lower tool 3 causes the workpiece 6 to bend along the bending line BL. The bending angles caused by this can be continuously acquired with corresponding measuring arrangements 4 or 4'. The acquisition range of the respective measuring arrangements is indicated by dashed lines. By way of example, FIG. 2 shows a measuring system consisting of two measuring arrangements 4 positioned below the workpiece 6 and imaging respective light patterns onto separate sections of the bottom side of the workpiece. A respective light pattern also falls onto a vertically extending surface of the lower tool 3. In the present embodiment, the respective light patterns are acquired by a respective image acquisition device 8 of the corresponding measuring arrangements 4, 4'. Alternatively, more than one image acquisition device 8 can be provided per measuring arrangement.

By means of an evaluation of the light patterns acquired via the measuring arrangements 4 by a corresponding evaluation device 5 (see FIG. 1), the bending of the workpiece 6 relative to the lower tool 3 can be determined. In particular, an inclined position of the upper tool and, optionally, also the wear of the tools can be acquired as well. Alternatively or additionally, one or more measuring arrangements 4' can also be positioned above the workpiece 6 to be bent in order to determine there, in combination with an evaluation device 5, the bending of the workpiece in two sections laterally next to the bending line BL.

In the following, embodiments are described in which only a single measuring arrangement 4 is used below the workpiece 6 in combination with an evaluation device 5 for determining a bending angle. However, it is considered within the scope of professionally valid actions to offset the data from several measuring arrangements to determine the bending angle more accurately.

Figure 3:
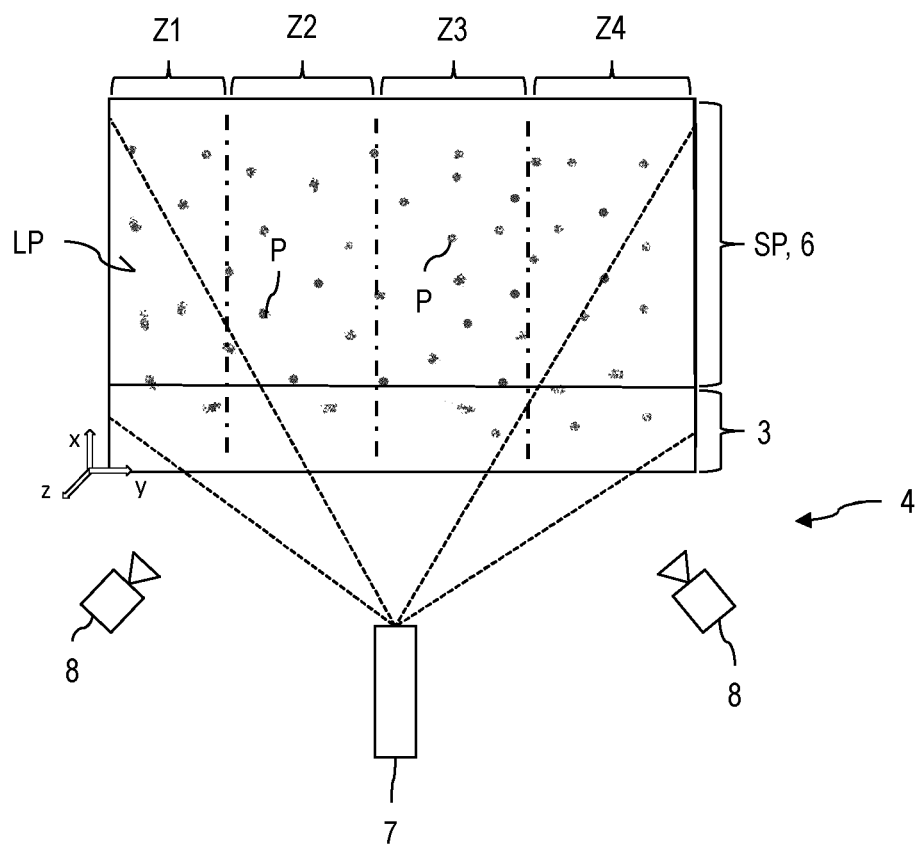
FIG. 3 to FIG. 5 show various examples of light patterns that can be imaged within the scope of the invention for determining bending angles on a corresponding workpiece during the bending process in a bending machine.
Figure 4:
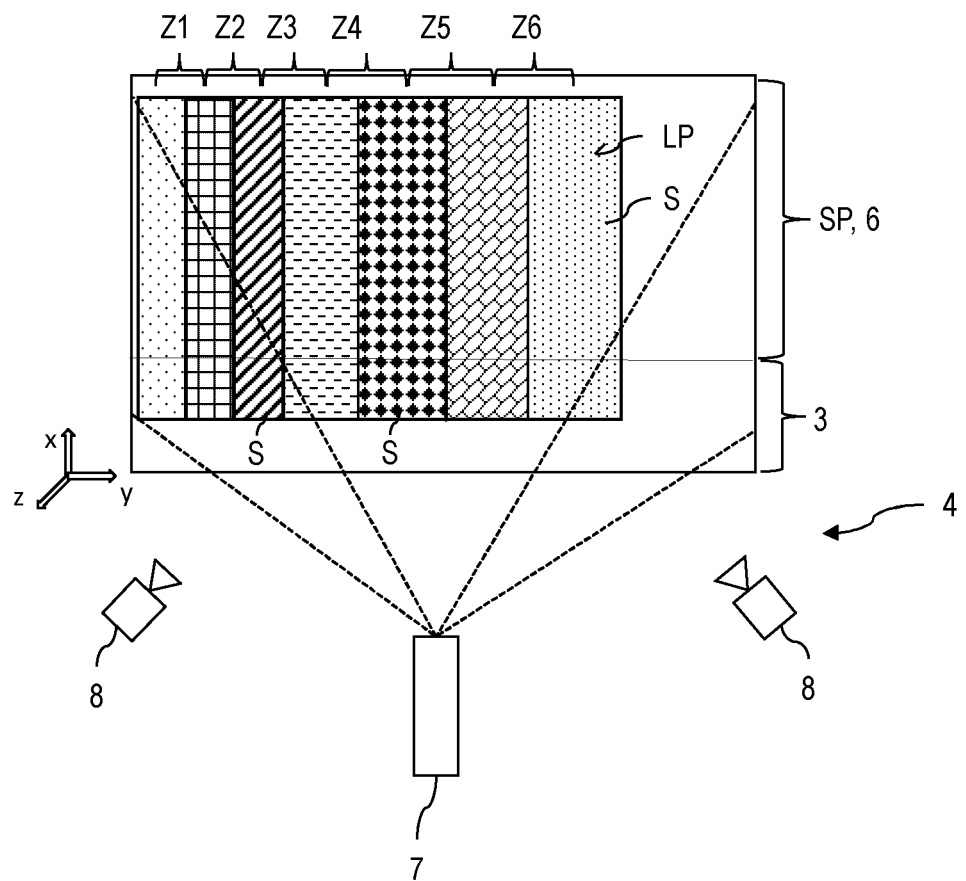
Figure 5:
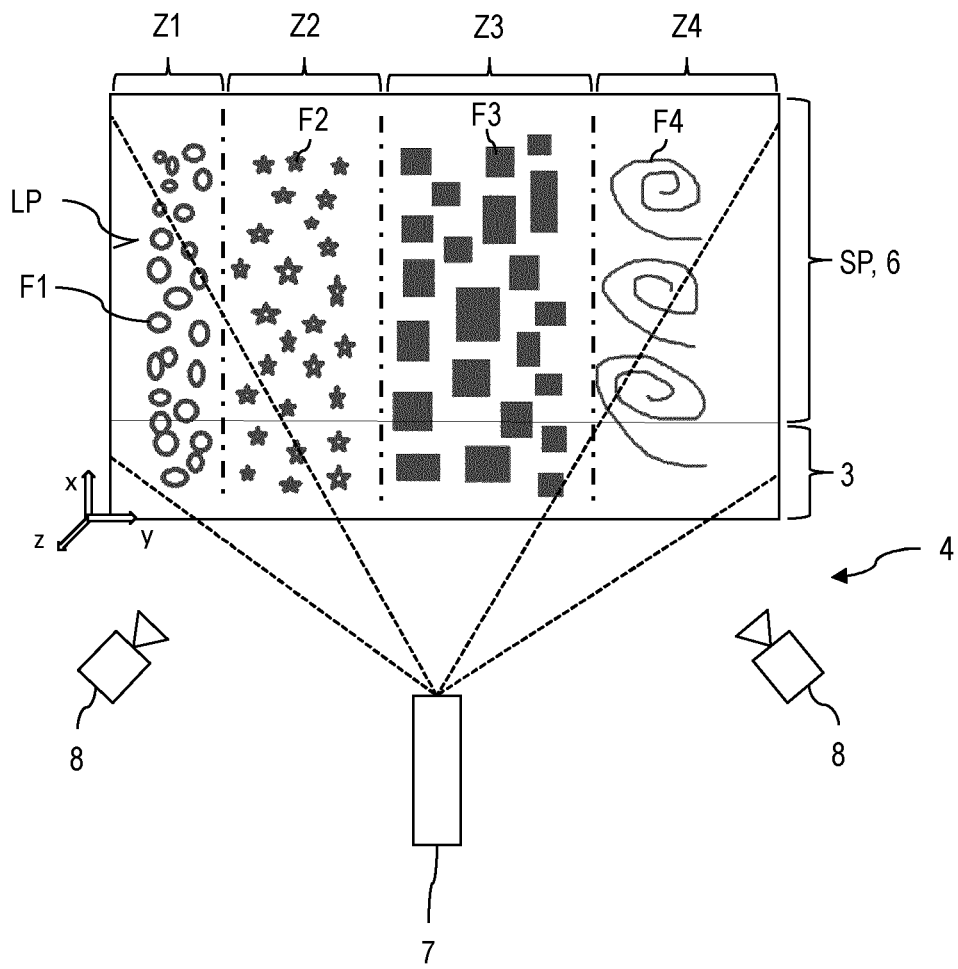

FIG. 3 to FIG. 5 concern different realisations of a corresponding measuring arrangement 4. The figures show a front view of the bottom side of the workpiece 6 currently being bent. According to the embodiment of FIG. 3, the measuring arrangement 4 includes an illumination device 7 using which a light pattern LP is imaged onto a surface portion SP of the bottom side of the workpiece 6 and onto a side surface of the lower tool 3. The radiating area of the illumination device 7 is indicated by four dashed lines. To generate the light pattern, the illumination device 7 uses light from the visible spectrum. Nevertheless, the light pattern can optionally also be generated by light in the non-visible infrared range or ultraviolet range. In principle, at least one illumination device 7 must be provided for the measuring arrangements 4, 4' in total. Ideally, at least one illumination device 7 is provided for each of the measuring arrangements 4, 4'. Alternatively, however, more than one illumination device 7 can be provided for each measuring arrangement 4, 4'.

In the embodiment of FIG. 3, the illumination device 7 images light of a specific colour or a specific colour mixture (e.g., white light) onto the workpiece 6, i.e., the illumination device generates a light pattern LP of uniform colour or colour mixture. The light pattern LP generated by the illumination device 7 using an optical system known per se (e.g., a diffractive optical system) comprises a plurality of points of substantially the same colour or colour mixture on the surface portion SP and the die 3. For reasons of clarity, only some of these points are designated with the reference sign P. The light pattern LP is an irregular and preferably stochastic point pattern.

The light pattern LP is composed of several zones Z1, Z2, Z3 and Z4, which are adjacent to one another along the bending line. For illustration purposes, the zones are separated by dash-dotted lines. These lines are not part of the depicted point pattern. In the embodiment of FIG. 3, the individual zones Z1, Z2, Z3 and Z4 cannot be distinguished purely from the structure of the point pattern, i.e., the light pattern shown does not contain any coding that would enable the zones to be distinguished from one another. However, in the corresponding evaluation device 5, the individual spatial extents of zones Z1 to Z4 are specified as digital data.

In the embodiment of FIG. 3, the light pattern LP with the points P contained therein is acquired by means of a stereoscopic 3D image acquisition device, which is schematically indicated by two cameras 8. The measuring arrangement was suitably calibrated in advance so that the acquired points P can be assigned to three-dimensional positions in a stationary coordinate system. Thus, the current three-dimensional positions of the individual points P of the light pattern are calculated from the three-dimensional image information of the 3D image acquisition device, i.e., a point cloud is determined. The individual points can be assigned to the corresponding zones Z1 to Z4, since these zones are specified in the evaluation device 5. Using algorithms known per se, the evaluation device 5 performs a linear regression in each of the individual zones Z1 to Z4 based on the positions of the points contained therein to determine the slope of the individual zones. In this way, corresponding bending angles of the surface portion SP are determined in the individual zones Z1 to Z4. Due to the use of the symmetrical punch 3, the bending angle between the two regions of the workpiece bending relative to one another can be determined in the respective zones.

In the embodiment of FIG. 3, a 3D image acquisition device is required to determine the bending angle in the individual zones, since the zones are not directly coded in the corresponding light pattern LP. In the variations described below, the generated light patterns directly code the corresponding information about the zones. Accordingly, it is not absolutely necessary to acquire the light patterns by means of a 3D image acquisition device because, by coding the zones, it is possible to obtain the spatial information about the bending angles by methods known per se even when the light pattern is acquired in two dimensions.

FIG. 4 shows a variant in which the light pattern LP comprises several stripes extending perpendicular to the bending line, only some of which are designated by the reference sign S for clarity. The stripes have different shades of grey (i.e., brightness), which is expressed in the black-and-white representation in FIG. 4 by a different patterning of the individual stripes. In other words, different areas of the workpiece 6 are illuminated to different degrees. Alternatively or additionally, the individual stripes S can also be distinguished by having different colours. By means of such stripes, the individual zones for which corresponding bending angles are determined are coded in the light pattern LP.

The corresponding zones are designated in FIG. 4 by the reference signs Z1 to Z6 and each comprise sections of two adjacent stripes. In other words, each zone contains a transition between two adjacent stripes. The transition is unique, i.e., in the entire pattern this transition from one grey level to another or from one colour to another exists only once. In this way, in the image acquired by the image acquisition device, each zone can be extracted from the image itself.

In the embodiment of FIG. 4, the light pattern LP is acquired by two 2D cameras 8. Optionally, it is also possible for only one of these cameras to be used to acquire the light pattern, since the zones are already coded in the light pattern itself and thus the bending angle can be determined via the change in the respective light zones during the bending process. Nevertheless, a second 2D camera can be used to redundantly acquire the same pattern again to increase measurement accuracy. Furthermore, it is also possible to use a 3D image acquisition device to acquire the light pattern, analogous to the embodiment of FIG. 3.

In the embodiment of FIG. 4, the information regarding the slope and thus the bending angle in the individual zones is determined based on the corresponding edges or transitions between the stripes. Preferably, the light section method known per se is used for this purpose, which uses the deformation of these edges to determine the slope of the workpiece in the corresponding zones and thus the associated bending angles. Optionally, this information can also be determined from the three-dimensional position of the corresponding edges between the stripes if a 3D image acquisition device is used. The individual edges are detected by means of a common edge detection using a high-pass filter.

FIG. 5 shows another embodiment in which the zones of the light pattern LP imaged onto the workpiece 6 are distinguished from one another via differently patterned regions. Four zones Z1 to Z4 are indicated, which are separated by dashed lines. These lines are not part of the imaged light pattern. The individual zones are distinguished in the light pattern using different types of graphical elements. For reasons of clarity, the different graphical elements are always designated only once in FIG. 5 with corresponding reference signs F1 to F4 in the respective zones Z1 to Z4. In the zone Z1, ring-shaped elements F1 are used to form the pattern contained there. In contrast, zone Z2 uses stars F2, zone Z3 uses rectangles F3, and zone Z4 uses spirals F4.

By means of a 3D image acquisition device, again indicated by two cameras 8, the three-dimensional positions of the individual graphical elements in the different zones can be acquired, wherein the zones themselves are directly identified by the type of graphical elements, without the zones having to be stored in advance in a corresponding evaluation device 5. Thus, a point cloud is determined to describe the three-dimensional positions of the individual graphical elements. From this, the evaluation device determines the slope of the workpiece in the individual zones. Optionally, it is also possible to acquire the individual zones in two dimensions and to derive the bending angles by the change in the patterns in the zones caused by the bending of the metal sheet.

The embodiments of the invention described in the foregoing provide a number of advantages. In particular, without mechanical movement of a measuring arrangement, the possibility is created to determine the bending angle of a formed workpiece within a bending machine for a plurality of different positions along the bending line. This information can then be further processed in a suitable manner. For example, it can be output via a user interface or used as part of a control loop to optimise the bending machine, for example to set the crowning or adjust other parameters (e.g., the punch position).

The invention claimed is:

1. A method for determining bending angles on a bending machine, wherein the bending machine comprises an upper tool and a lower tool configured to form a workpiece arranged between the upper tool and the lower tool by bending along a bending line of the workpiece, wherein one or more measuring arrangements are positioned on the bending machine, each measuring arrangement including at least one illumination device and at least one acquisition device, and wherein each measuring arrangement is assigned a different surface portion of the workpiece which lies laterally adjacent to the bending line and extends along the bending line, the method comprising the steps of:
    imaging a light pattern on the workpiece by means of each illumination device onto a corresponding one of the surface portions, wherein each light pattern comprises a plurality of zones arranged side by side along the bending line, the plurality of zones are arranged immediately adjacent side by side such that each light pattern covers the corresponding surface portion;
    acquiring each light pattern by means of the at least one image acquisition device wherein image information of each light pattern is obtained;
    identifying each zone from the image information by means of an evaluation device;
    determining a bending angle caused by bending within each zone, wherein each bending angle is determined for each zone along an entirety of the bending line of the workpiece without contact and without mechanical movement of each measuring arrangements.

2. The method according to claim 1, further comprising steps of acquiring three-dimensional image information via the at least one image acquisition device, wherein the acquisition device is a 3D image acquisition device; or acquiring a two-dimensional image information via the at least one image acquisition device, wherein the acquisition device is a 2D image acquisition device.

3. The method according to claim 1, further comprising a step of, for at least one of the measuring arrangements, defining each zone in the light pattern by means of respective spatial extents along the bending line which are stored in the evaluation device, where in the at least one image acquisition device is a 3D image acquisition device.

4. The method according to claim 1, further comprising a step of, for at least one of the one or more measuring arrangements, coding each zone in the light pattern, wherein the evaluation device is configured to decode the coding from the obtained image information of the light pattern thereby identifying each zone.

5. The method according to claim 4, wherein the step of coding each zone comprises coding one or more zones of the plurality of zones via light frequencies and/or via different brightnesses in the light pattern.

6. The method according to claim 5, wherein one or more zones of the plurality of zones comprise stripes with different brightnesses and/or frequency spectra, and wherein the stripes extend perpendicular to the bending line on the workpiece.

7. The method according to claim 6, wherein the stripes are adjacent to one another and represent at their adjacent edges unique light frequency and/or brightness transitions, each of which occurs only once in the light pattern.

8. The method according claim 4, wherein the step of coding each zone comprises coding one or more zones of the plurality of zones over differently patterned regions.

9. The method according to claim 8, wherein one of the differently patterned regions comprises same types of graphical elements for pattern formation within the one of the differently patterned regions, and wherein types of graphical elements differ between the differently patterned regions.

10. The method according to claim 1, further comprising a step of, for at least one of the one or more measuring arrangements, imaging the light pattern onto a region of the lower tool or upper tool and, by evaluating image information of a region acquired with the at least one image acquisition device, determining bending angles for each zone with respect to the region by means of the evaluation device.

11. The method according to claim 1, wherein the one or more measuring arrangements comprises a plurality of measuring arrangements positioned on the bending machine, the at least one illumination device images light patterns with the same or overlapping extensions along the bending line onto the different surface portions of the workpiece, as a result of which each bending angle is determined by means of the evaluation device for each zone along the bending line, which are based on each light pattern from each measuring arrangement, wherein an averaged bending angle or a bending angle between two bending regions of the workpiece bent about the bending line is calculated from the plurality of bending angles by means of the evaluation device for each surface portion, wherein a division of each light pattern into the plurality of zones is identical for each measuring arrangement.

12. The method according to claim 1, further comprising a step of changing one or more parameters of the bending machine during bending depending on the bending angles as triggered by the evaluation device.

13. The method according to claim 1, wherein the bending machine comprises an automatically operable crowning device for producing a curvature of the lower tool during bending, and wherein the curvature is configured to be adjusted depending on the bending angles.

14. A device for determining bending angles on a bending machine comprising an upper tool and a lower tool for reshaping a workpiece arranged between the upper tool and the lower tool by bending along a bending line of the workpiece, wherein the device comprises an evaluation device and one or more measuring arrangements configured to be positioned in an operating position of the device on the bending machine, each measuring arrangement including at least one illumination device and at least one image acquisition device, wherein in the operating position each measuring arrangement is assigned to a different surface portion of the workpiece which lies laterally adjacent to the bending line and extends along the bending line, wherein the device is configured such that in the operating position:
   a light pattern is imaged on the workpiece by each illumination device onto a corresponding one of the surface portions,
   each light pattern comprises a plurality of zones arranged side by side along the bending line, the plurality of zones arranged immediately adjacent side by side, wherein each light pattern covers the corresponding surface portion;
   each light pattern is acquired by means of the at least one image acquisition device, whereby image information of each light pattern is obtained; and
   each zone is identified from the image information of each light pattern by means of the evaluation device and a bending angle caused by bending is determined for each zone, wherein the bending angles are determined for each zone along an entirety of the bending line of the workpiece without contact and without mechanical movement of the one or more measuring arrangements.

15. A bending machine comprising a device configured to determine a bending angle wherein:
   the bending machine comprises an upper tool and a lower tool for reshaping a workpiece arranged between the upper tool and the lower tool by bending along a bending line of the workpiece, wherein the device comprises an evaluation device and one or more measuring arrangements configured to be positioned in an operating position of the device on the bending machine, each measuring arrangement including at least one illumination device and at least one image acquisition device, wherein in the operating position each measuring arrangement is assigned to a different surface portion of the workpiece which lies laterally adjacent to the bending line and extends along the bending line, wherein the device is configured such that in the operating position:
   a light pattern is imaged on the workpiece by each illumination device onto a corresponding one of the surface portions,
   each light pattern comprises a plurality of zones arranged side by side along the bending line, the plurality of zones arranged immediately adjacent side by side, wherein each light pattern covers the corresponding surface portion;
   each light pattern is acquired by means of the at least one image acquisition device, whereby image information of each light pattern is obtained; and
   each zone is identified from the image information of each light pattern by means of the evaluation device and a bending angle caused by bending is determined for each zone, wherein the bending angles are determined for each zone along an entirety of the bending line of the workpiece without contact and without mechanical movement of the one or more measuring arrangements.

* * * * *